(12) United States Patent
Johno et al.

(10) Patent No.: US 8,184,352 B2
(45) Date of Patent: May 22, 2012

(54) OPTICAL SCANNING DEVICE AND IMAGE FORMING APPARATUS

(75) Inventors: Hiroshi Johno, Kanagawa (JP); Takeshi Yamakawa, Kanagawa (JP); Keiichi Serizawa, Kanagawa (JP); Kazunori Watanabe, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 12/929,605

(22) Filed: Feb. 3, 2011

(65) Prior Publication Data

US 2011/0199663 A1  Aug. 18, 2011

(30) Foreign Application Priority Data

Feb. 15, 2010  (JP) ................. 2010-030523

(51) Int. Cl.
*G02B 26/08* (2006.01)
(52) U.S. Cl. ............... 359/204.1; 359/216.1; 347/245
(58) Field of Classification Search .... 359/196.1–226.2; 347/242, 245, 257, 263
See application file for complete search history.

(56) References Cited

U.S. PATENT DOCUMENTS

| 7,443,556 B2 | 10/2008 | Serizawa |
| 7,782,501 B2 | 8/2010 | Serizawa |
| 2006/0209375 A1 | 9/2006 | Serizawa |
| 2007/0098460 A1 | 5/2007 | Serizawa |
| 2009/0009836 A1 | 1/2009 | Narita et al. |
| 2010/0033787 A1 | 2/2010 | Serizawa et al. |
| 2010/0309277 A1 | 12/2010 | Watanabe et al. |

FOREIGN PATENT DOCUMENTS

| JP | 2008076586 A | 4/2008 |
| JP | 2008096952 A | 4/2008 |

*Primary Examiner* — James Phan
(74) *Attorney, Agent, or Firm* — Harness, Dickey & Pierce, P.L.C.

(57) ABSTRACT

An optical scanning device of opposed scanning type, includes: a plurality of light sources, being arranged substantially symmetrically about a rotating deflection unit; a group of pre-deflection optical elements including optical elements that make the light beams incident on the rotating deflection unit; and scanning optical systems which are distributed to right and left with the rotating deflection unit as an axis of symmetry, wherein optical elements of the respective scanning optical systems are arranged substantially symmetrically about the rotating deflection unit, wherein a plurality of rib structures are arranged on respective areas of an optical housing substrate, the areas extends from the respective light sources to a vicinity of the rotating deflection unit, and the plurality of rib structures are arranged asymmetrically in the right and left optical systems with the rotating deflection unit as the axis of symmetry.

9 Claims, 9 Drawing Sheets

(SECTION A-A)

(SECTION A-A)

—— SCANNING LINE AFTER DEFORMATION
---- SCANNING LINE BEFORE DEFORMATION

HIGH HEAT GENERATION 17b
17a
16

HIGH HEAT GENERATION

RIB 25   RIB 25

TEMPERATURE GRADIENT

LOW   HIGH

AREA OF EQUAL TEMPERATURE DISTRIBUTION

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2010-030523 filed in Japan on Feb. 15, 2010.

BACKGROUND OF THE INVENTION

1. Field of the Invention

The present invention relates to an optical scanning device and an image forming apparatus, and more particularly to a mechanism for preventing deviation in writing position of a mechanism that performs optical scanning simultaneously on a plurality of image carriers.

2. Description of the Related Art

Image forming apparatuses such as a copying machine, printer, facsimile machine, and printing machine of, for example, electrophotographic type are equipped with an optical scanning device as a device that forms an electrostatic latent image according to an original or image information onto a photosensitive element that is used as a latent image carrier.

Aside from the formation of monochromatic images, some optical scanning devices are used to form images in a plurality of colors to obtain a full-color image.

In recent years, a method that allows simultaneous exposure scanning on a plurality of photosensitive elements has often been used in color laser printers, color digital copying machines, and the like so as to improve productivity.

An optical scanning device capable of such simultaneous exposure scanning on a plurality of photosensitive elements has scanning optical systems corresponding to the respective photosensitive elements. The number of optical elements needed increases simply in proportion to the number of photosensitive elements, with an inevitable increase in parts count.

As a mechanism for simultaneously performing exposure scanning on a plurality of photosensitive elements, an optical scanning device of so-called opposed scanning type has already been known which uses only one rotating deflection unit which is an expensive part. Optical elements are arranged generally symmetrically about the rotating deflection unit so that both the right and left sides are scanned with a plurality of independent light beams (for example, see Japanese Patent Application Laid-open No. 2008-76586).

Japanese Patent Application Laid-open No. 2008-76586 discloses a configuration of the optical scanning device of so-called opposed scanning type which can perform exposure scanning on both the right and left sides by using the single rotating deflection unit.

Such an optical scanning device of opposed scanning type typically has a plurality of scanning optical systems, i.e., as many as the number of photosensitive elements in one optical housing in order to perform exposure scanning on each individual photosensitive element.

For space savings of the device, the only rotating deflection unit has upper and lower, two stages of reflecting surfaces. Independent scanning optical systems are provided for the respective stages.

The optical elements that constitute a scanning optical system include a scanning lens, a plurality of reflecting mirrors, and a long lens (toroidal lens) that has power in a sub-scanning direction. The layout of such optical elements and the performance of the elements themselves have a significant impact on the image quality.

For example, in an optical scanning device that is capable of simultaneous exposure scanning on a plurality of photosensitive elements, it is important to always adjust deviations of the scanning lines formed on the respective photosensitive elements (here, the curvature of the scanning lines) to constant values. With uneven geometry, the scanning lines can cause misregistration resulting in image deterioration.

In particular, when a color image forming apparatus or the like develops toners of different colors on a respective plurality of photosensitive elements, color deviations on the photosensitive elements can cause a significant deterioration in color reproducibility.

The curvature of the scanning lines is typically dominated by the scanning lenses that have power in the sub-scanning direction (typically corresponding to long lens), provided in the scanning optical system.

More specifically, a scanning line curves when the focal lines of the scanning lens which form the center of the optical axis are not in parallel with the mounting surface (seating surface) of the lens. The curvature of the focal lines is inevitable because of the process limitation in lens formation. The curvature of the focal lines could be reduced but with an increase in the fabrication cost.

Resin lenses have been used more often recently due to advantages such as low price and the formability of free curves in particular. Resin lenses suffer the curvature of the focal lines more severely than glass lenses do, because of internal distortion during molding, uneven mold temperatures, etc.

In such an optical scanning device of opposed scanning type, it is also important that all the beam spots on the respective photosensitive elements have equal characteristics. Even a slight difference in the characteristics of the beams on the respective photosensitive elements can produce image defects such as poor color reproducibility and hue variations.

As employed herein, the "beam spot characteristics" include not only the beam spot diameter but also the beam intensity (light intensity) and the beam spot position (imaging position). What is essential is how to perform uniform exposure onto each photosensitive element.

Examples of the causes for the deterioration of the beam spot characteristics include a deformation of the mounting positions of the optical elements due to thermal expansion and a deviation in the incident positions of the beams on the respective optical elements because of elevated temperatures inside the optical housing of the optical scanning device.

To prevent the occurrence of such deviations in the beam incident position and suppress color deviations, the foregoing Japanese Patent Application Laid-open No. 2008-76586 discloses the following configuration.

That is, a scanning optical device includes: a plurality of light sources; a light source holding member that holds the light sources; a deflection scanning unit that deflects light beams emitted from the light sources in a scanning manner; a plurality of scanning optical systems that are arranged on only one side or both sides of an axis of rotation of the deflection scanning unit, and scan photosensitive elements with the respective different light beams that are deflected in a scanning manner by the deflection scanning unit; a housing member that accommodates the light source holding member, the deflection scanning unit, and the plurality of scanning optical systems; and a biasing unit that biases the light source holding member against the housing member in a direction of the axis of rotation of the deflection scanning unit, the plurality of scanning optical systems including light beam reflecting units that reflect the respective light beams, any one of the light beams being reflected by at least a plurality of light beam reflecting units. In the scanning optical device, the positions of the plurality of scanning optical systems with respect to the axis of rotation of the deflection scanning unit, the number of light beam reflecting units, and the biasing direction of the biasing unit can be set to reduce the amount of variation in the relative position between the irradiation positions of the photosensitive elements with the respective light beams when the light source holding member tilts against the biasing force of the biasing unit.

Now, suppose that the deflection scanning unit in the optical scanning device is driven by a motor or the like. In such a case, heat from the motor can sometimes reach the optical members in the peripheral areas through air flows created by the rotation of the deflection scanning unit. The foregoing resin lenses, if used, may cause deviation of the optical axis due to variations in the temperature distributions in the direction of the optical axis and in the main-scanning direction.

To prevent such a thermal deformation of the resin lenses, there has been proposed a configuration to enclose the deflection scanning unit in a shielded space independent of the resin lenses (for example, see Japanese Patent Application Laid-open No. 2008-96952).

The configuration for suppressing thermal deformation of the resin lenses, disclosed in Japanese Patent Application Laid-open No. 2008-96952, can promise to avoid an increase in the ambient temperature of the resin lenses and other optical elements because of the air flows. Such a configuration, however, gives rise to the following new problem.

Each component of the optical scanning device is supported on the housing of the optical scanning device, and there is no means to prevent heat propagation through the housing to the supporting section of each component.

Consequently, the positions of the scanning lines can vary due to variations in the mounting positions of the optical elements and changes in the mounting orientations because of thermal deformation of the light source holding member and thermal deformation of the housing caused by heat sources in the optical scanning device (such as when driving the rotating deflection unit). In particular, when the opposed optical paths on the right and left of the rotating deflection unit undergo symmetric changes, the irradiation positions of the photosensitive elements with the respective light beams move in opposite directions, causing even severer color deviations. Such a problem has been unsolved yet.

SUMMARY OF THE INVENTION

It is an object of the present invention to at least partially solve the problems in the conventional technology.

According to an aspect of the present invention, there is provided an optical scanning device of opposed scanning type, comprising: a plurality of light sources corresponding to a plurality of photosensitive elements, the light sources being arranged substantially symmetrically about a rotating deflection unit that is located substantially in a center of an optical housing; a group of pre-deflection optical elements including at least one or a plurality of optical elements that shape divergent light from the light sources into light beams having a predetermined cross-sectional shape and make the light beams incident on the rotating deflection unit; and scanning optical systems which are provided to perform exposure scanning on the photosensitive elements with the respective corresponding light sources, each of which includes a reflecting optical element and at least one lens having power in a main-scanning direction and a sub-scanning direction, and which are distributed to right and left with the rotating deflection unit as an axis of symmetry, wherein optical elements of the respective scanning optical systems are arranged substantially symmetrically about the rotating deflection unit, and the optical elements are arranged in a same order of arrangement performing exposure scanning on the plurality of photosensitive elements simultaneously, wherein a plurality of rib structures are arranged on respective areas of an optical housing substrate where the group of pre-deflection optical elements are arranged, the areas extends from the respective light sources to a vicinity of the rotating deflection unit, and the plurality of rib structures are arranged asymmetrically in the right and left optical systems with the rotating deflection unit as the axis of symmetry, so as to suppress an amount of variation in positions of scanning lines of the light beams on the photosensitive elements when the areas are displaced by thermal expansion.

According to still another aspect of the present invention, there is provided an image forming apparatus comprising the optical scanning device mentioned above.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment for carrying out the present invention will be described with reference to the drawings.

Figure 1:
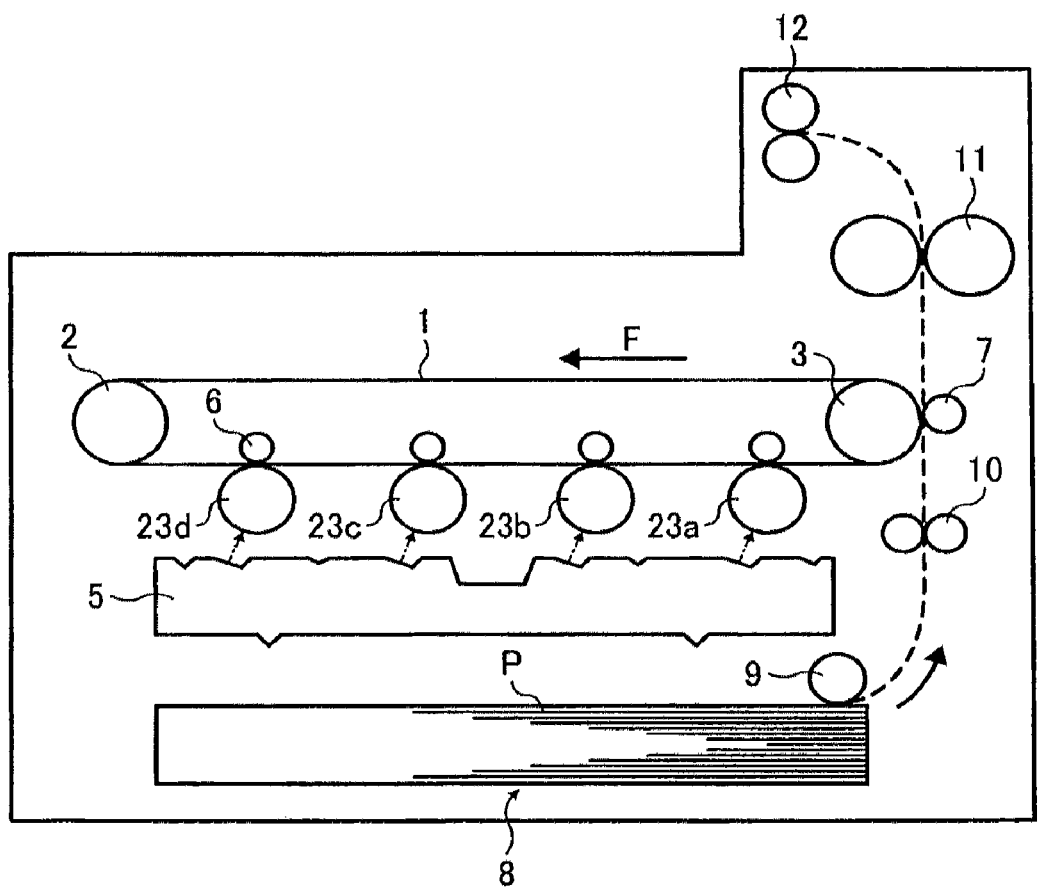
FIG. 1 is a schematic diagram showing an image forming apparatus which uses an optical scanning device according to the present invention.
Figure 2:
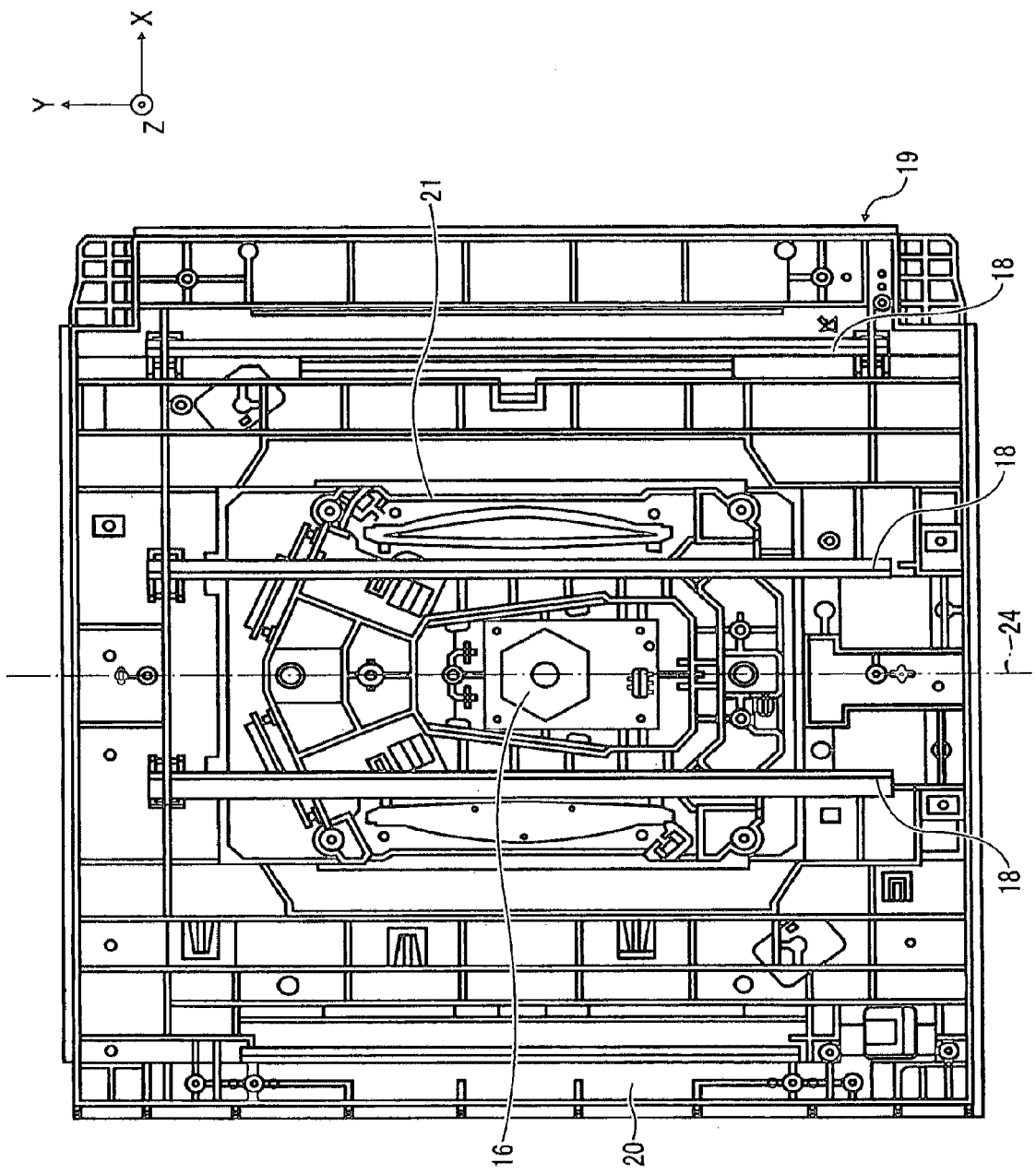
FIG. 2 is a plan view showing the internal configuration of the optical scanning device for the present invention.

FIG. 1 shows a color printer which is an image forming apparatus which uses an optical scanning device according to the present invention.

The image forming apparatus shown in FIG. 1 includes an intermediate transfer belt 1 as an image carrier. The intermediate transfer belt 1 is wound across rollers 2 and 3. One of the rollers is driven to rotate counterclockwise as a driving roller, whereby the intermediate transfer belt 1 is driven to run in the direction of the arrow F.

First to fourth drum-like photosensitive elements 23a to 23d are arranged in parallel under the lower running side of the intermediate transfer belt 1, whereby an image forming apparatus of tandem type is constituted.

A yellow toner image, a cyan toner image, a magenta toner image, and a black toner image are formed on the photosensitive elements, respectively.

The photosensitive elements are driven to rotate clockwise in FIG. 1. The surfaces of the photosensitive elements are uniformly charged to a predetermined polarity by a not-shown charging unit. The charged surfaces are irradiated with optically modulated light beams emitted from an optical scanning device 5. This forms electrostatic latent images on the photosensitive elements. The electrostatic latent images are visualized by a developing unit (not shown). For example, a latent image on the leftmost photosensitive element 23d is visualized as a yellow toner image.

With the yellow toner image formed thus, a voltage having a polarity reverse to that of the toner is applied to a transfer roller 6 that is arranged on the other side of the intermediate transfer belt 1, the other side being from the photosensitive element 23d. The yellow toner image on the photosensitive element 23d is thereby transferred to the intermediate transfer belt 1.

The cyan toner image, magenta toner image, and black toner image are formed on the remaining photosensitive elements 23a, 23b, and 23c by the same procedure, respectively. Such toner images are transferred to the intermediate transfer belt 1 in succession so as to be superposed on the yellow toner image.

With the belt running, the four-color toner image formed on the intermediate transfer belt 1 moves to a secondary transfer section at the right end of FIG. 1 where a secondary transfer roller 7 is arranged.

A feed unit 8 is arranged in the lower part of the apparatus body. A paper feeding unit 9 feeds a recording material P made of, for example, transfer paper from the feed unit 8 in the direction of an arrow. The fed recording material P is abutted against a registration roller 10 before fed into the secondary transfer section of the intermediate transfer belt 1 at timing when the toner image is properly transferred onto the recording material P.

In the secondary transfer section, a voltage having a polarity reverse to that of the toners on the intermediate transfer belt 1 is applied to the secondary transfer roller 7. The superposed and transferred toner image on the intermediate transfer belt 1 is thereby transferred onto the recording material P.

The recording material P having the toner image transferred is conveyed upward through a fixing unit 11 to fix the toner image before discharged through between discharging rollers 12 to a discharging unit on the top of the apparatus body. Toners and other stains remaining on the photosensitive elements and the intermediate transfer belt 1 after transfer are removed by respective not-shown cleaning units.

FIGS. 2 to 4B are diagrams showing the configuration of the optical scanning device. The optical scanning device shown in the diagrams is an optical scanning device of opposed scanning type. The only rotating deflection unit has upper and lower of two stages of reflecting surfaces, and independent scanning optical systems are provided and used for the respective stages.

Figure 3:
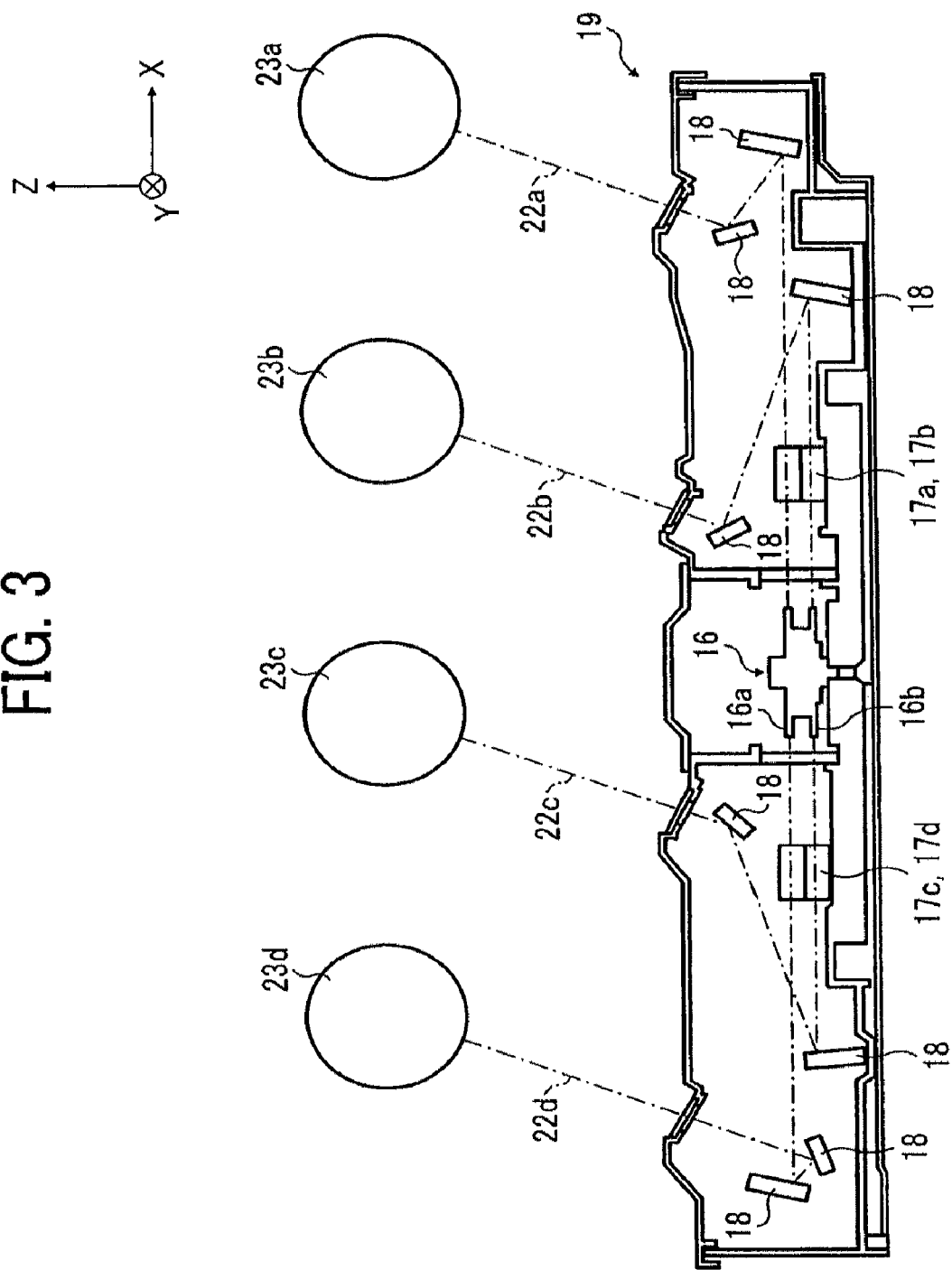
FIG. 3 is a diagram for explaining scanning optical systems of the optical scanning device.
Figure 4A:
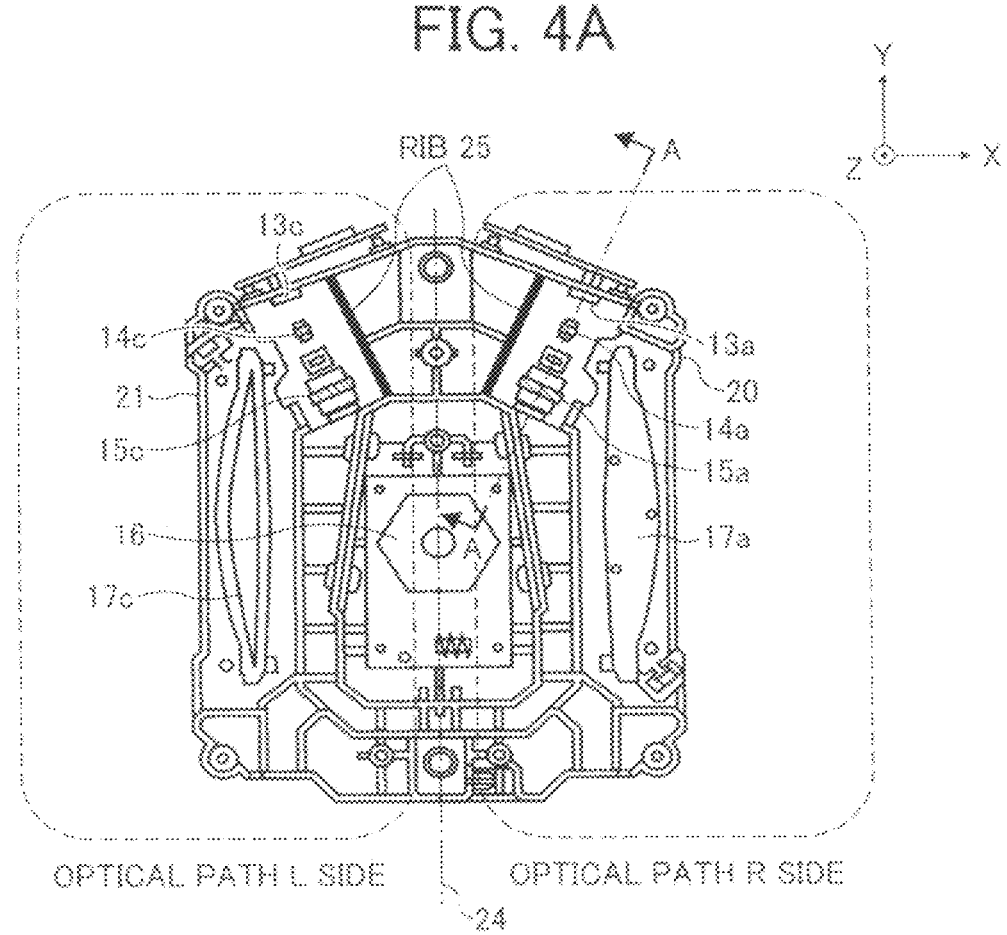
FIGS. 4A and 4B are diagrams showing the configuration of essential parts of the optical scanning device shown in FIG. 2.
Figure 4B:
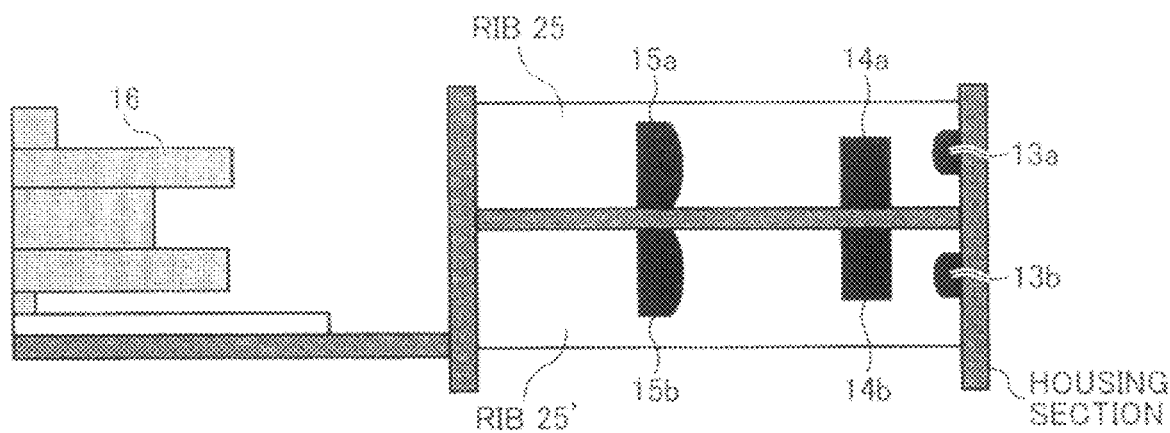

More specifically, as shown in FIGS. 4A and 4B, the optical scanning device includes light sources 13a to 13d, collimator lenses 14a to 14d, cylindrical lenses 15a to 15d, a rotating defection unit 16, double-layered scanning imaging elements 17a and 17b, and 17c and 17d, and reflectors (mirrors) 18. The light sources 13b and 13d are not shown in FIG. 4A, whereas they are attached to the same positions as the light sources 13a and 13c are in the plan view, at a distance in the Z direction. Although not shown in FIG. 4A, the collimator lenses 14b and 14d are attached to the back side of where the collimator lenses 14a and 14c are; the cylindrical lenses 15b and 15d are attached to the back side of where the cylindrical lenses 15a and 15c are. The collimator lenses 14a to 14d and the cylindrical lenses 15a to 15d constitute a pre-deflection optical system. The rotating defection unit 16 includes two stages of six-sided polygonal mirrors 16a and 16b (see FIG. 3). Such components are arranged in an optical housing 19 generally symmetrically about the rotating defection unit 16 as the axis of symmetry.

The optical housing 19 has a first accommodating section 20 which primarily accommodates the rotating deflection unit and fθ lenses, and a second accommodating section 21 which accommodates the reflectors and the like.

In the optical scanning device, light beams 22a to 22d emitted from the respective light sources 13a to 13d pass through the respective collimator lenses 14a to 14d and cylindrical lenses 15a to 15d before simultaneously being deflected for scanning by the rotating defection unit 16 as shown in FIG. 3.

For example, the light beam emitted from the light source 13a is deflected by the polygon mirror 16a in the upper stage of the rotating defection unit 16. The light beam is then passed through the scanning imaging element 17a of the double layer configuration and reflected by a reflecting mirror 18 before reflected by another reflecting mirror 18 to form a beam spot on the photosensitive element 23a for scanning.

The light beam emitted from the light source 13b, for example, is deflected by the polygon mirror 16b in the lower stage of the rotating defection unit 16. The light beam is then passed through the scanning imaging element 17b of the double layer configuration and reflected by a reflecting mirror 18 before reflected by another reflecting mirror 18 to form a beam spot on the photosensitive element 23b for scanning.

Similarly, the light beam emitted from the light source 13c is deflected by the polygon mirror 16b in the lower stage of the rotating defection unit 16. The light beam is then passed through the scanning imaging element 17c of the double layer configuration and reflected by a reflecting mirror 18 before reflected by another reflecting mirror 18 to form a beam spot on the photosensitive element 23c for scanning.

The light beam emitted from the light source 13d is deflected by the polygon mirror 16a in the upper stage of the rotating defection unit 16. The light beam is then passed through the scanning imaging element 17d of the double layer configuration and reflected by a reflecting mirror 18 before reflected by another reflecting mirror 18 to form a beam spot on the photosensitive element 23d for scanning.

Now, in FIG. 4A, the dashed line designated by the reference numeral 24 (hereinafter, also referred to as a long dashed line) represents the axis of symmetry about the rotating deflection unit 16. A front optical system of the rotating deflection unit 16 is arranged on each side of the long dashed line 24, so as to come between the light source 13a (13c), collimator lens 14a (14c), and cylindrical lens 15a (15c) and the rotating deflection unit 16. The front optical system constitutes an optical system for introducing laser light to the rotating deflection unit. The optical paths of the opposed scanning optical systems on the right and left of the diagram will be referred to as an optical path R and an optical path L, respectively.

Figure 5:
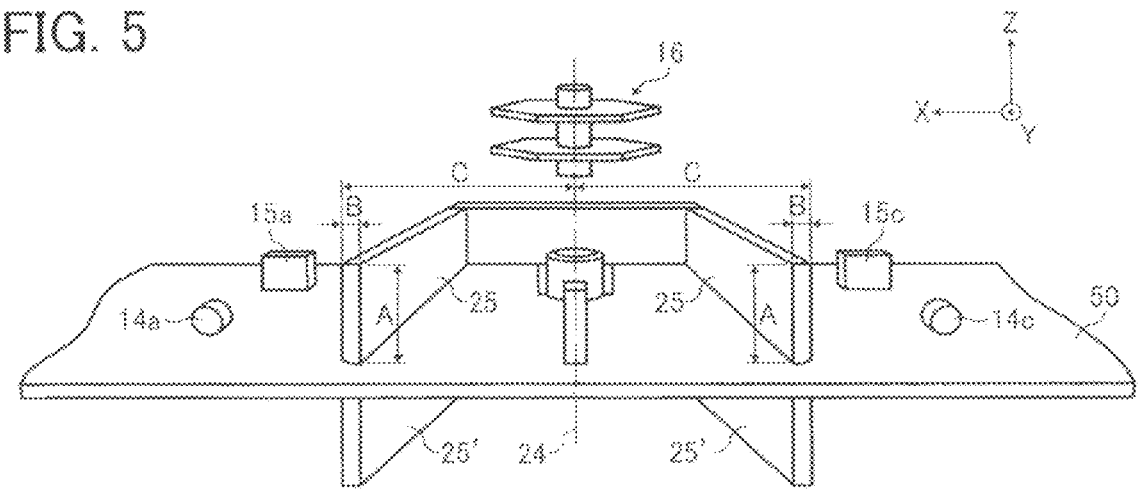
FIG. 5 is a diagram showing where pre-deflection optical elements are mounted in the essential parts shown in FIGS. 4A and 4B, as viewed in a sub-scanning direction.

FIG. 4B is a sectional view taken along the line indicated by the arrows A of FIG. 4A. FIG. 5 is a diagram showing the rotating deflection unit 16 as seen from the light source side. The following description will be given on such bases.

As shown in FIGS. 4A to 5, the optical elements are arranged in the same order and configuration on the right and left of the axis of symmetry about the rotating deflection unit 16. The rotating deflection unit 16 is arranged on a housing substrate 50, and reinforcing ribs 25 and 25' are formed both on the top and bottom of the housing substrate 50.

Figure 6:
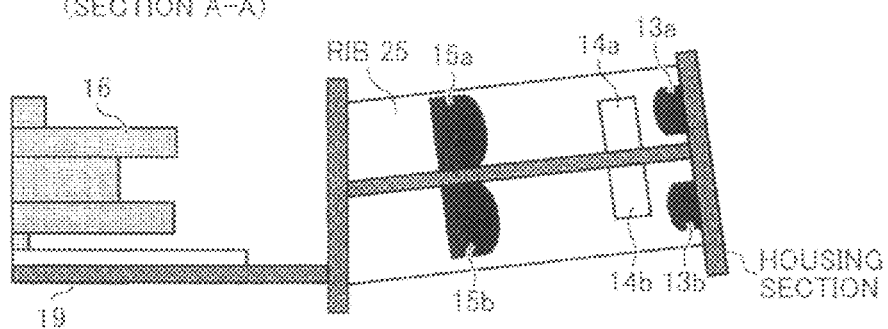
FIG. 6 is a diagram for explaining a problem of the optical scanning device.

When the rotating deflection unit 16 is driven, the vicinity of the rotating deflection unit 16 is typically heated. The peripheral parts of the housing 19 remain at normal temperatures, or increase in temperature but by only a smaller amount than in the vicinity of the rotating deflection unit. The thermal expansion in the vicinity of the rotating deflection unit therefore has no escape, and as shown in FIG. 6, the housing 19 is warped from the horizontal directions which are the directions of the optical paths of the deflected light from the rotating deflection unit 16. Here, the housing makes a displacement vertically upward with respect to the rotating deflection unit 16 in the vicinities of the light sources 13 on both the optical path R side and the optical path L side.

Figure 7:
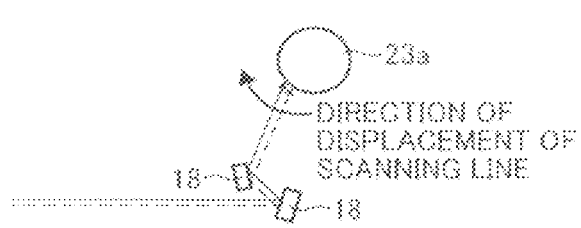
FIG. 7 is a diagram for explaining how the positions of irradiation of photosensitive elements deviate due to the problem shown in FIG. 6.
Figure 7:
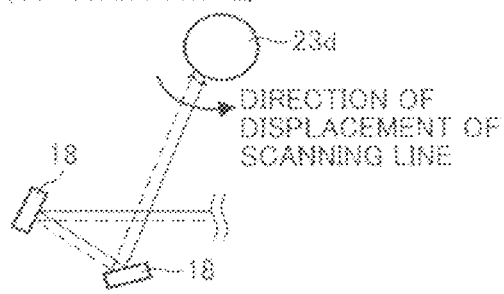

Take, as an example, variations in the positions of the scanning lines on the photosensitive elements due to the displacement of the light sources 13a and 13d. As shown in FIG. 7, the positions of the optical paths R and L on the photosensitive elements vary in respective opposite directions, which increases the amount of color deviation. It should be noted that the warping direction shown in FIG. 6 is just an example, and convex warpage can also occur. Since the light sources of the optical paths R and L are displaced in the same directions, the resulting displacements of the optical paths on the respective photosensitive elements are in opposite directions.

The characteristics of the present invention will now be described in view of the configuration of such an optical scanning device.

Figure 8A:
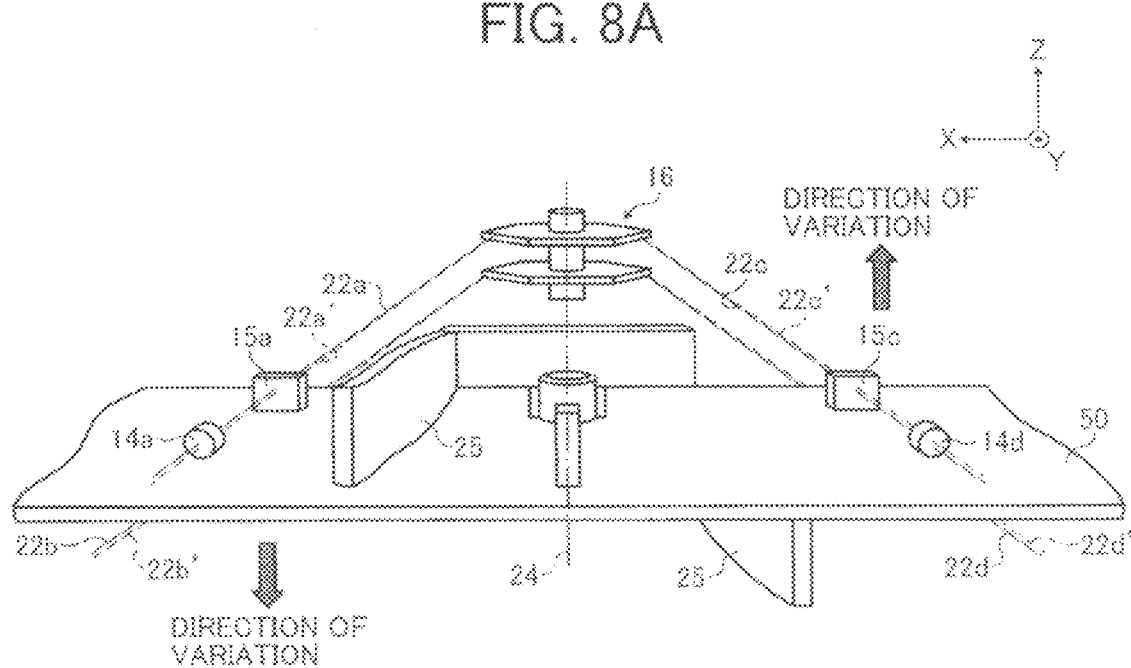
FIGS. 8A and 8B are diagrams for explaining a characteristic of the inventions according to example embodiments.
Figure 8B:
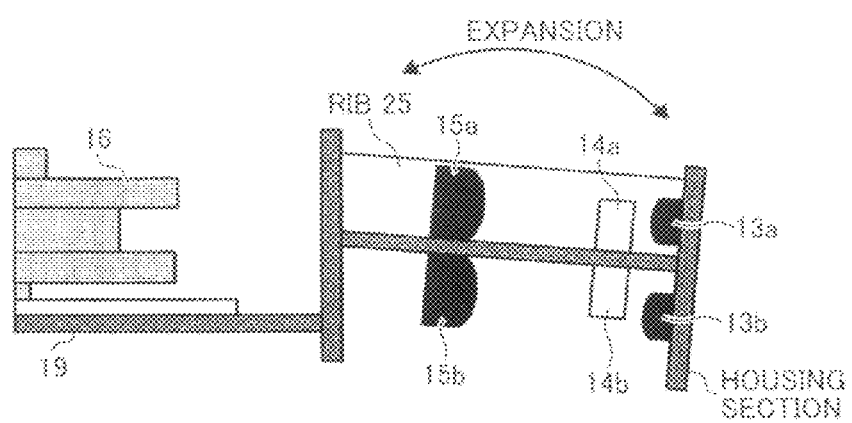

FIGS. 8A and 8B are diagrams showing an embodiment of the inventions according to example embodiments. In FIG. 8A, the optical housing substrate 50 has a plurality of rib structures in the areas that extend from the respective light sources to the rotating deflection unit 16. The rib structures are composed of ribs 25 that are formed asymmetrically in the right and left optical systems with the rotating deflection unit 16 as the axis of symmetry.

Figure 9:
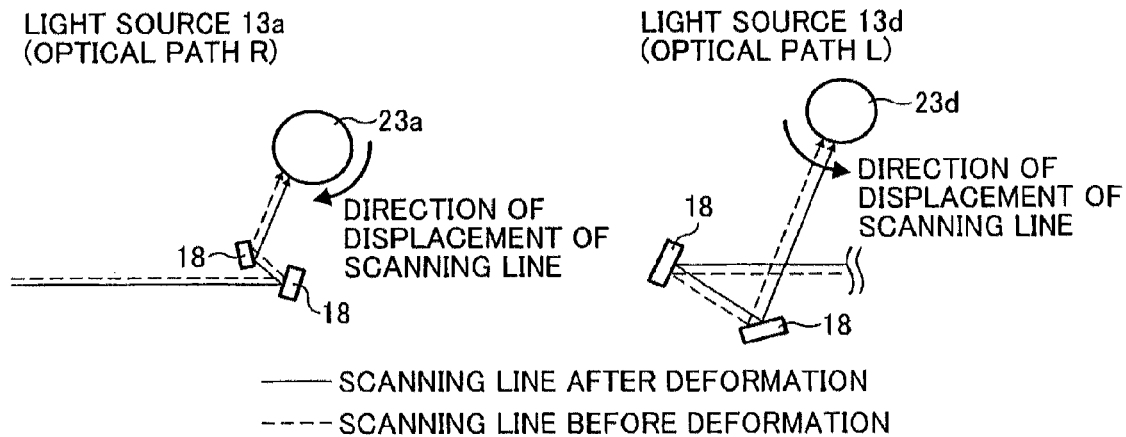
FIG. 9 is a diagram for explaining the positions of irradiation of the photosensitive elements resulting from the characteristic shown in FIGS. 8A and 8B.

In the present embodiment of such configuration, thermal expansion due to the heat from the rotating deflection unit 16 brings the optical elements into a state such as shown in FIG. 8B. More specifically, when the rib 25 is heated, the expansion of the rib 25 warps the surface where the optical elements prior to the rotating deflection unit 16 are arranged, to the side where there is no rib 25. The light source 13a on the left in FIG. 8A is displaced vertically downward (as indicated by the downward direction of variation in FIG. 8A). Meanwhile, the light source 13d on the right in the diagram is displaced vertically upward (as indicated by the upward direction of variation in FIG. 8A). Consequently, as shown in FIG. 9, the light source 13a (optical path R) and the light source 13d (optical path L) are displaced in the same directions on the respective photosensitive elements as indicated by the legends "scanning line before deformation" and "scanning line after deformation" in FIG. 9. This prevents an increase in the amount of deviation in the relative direction and allows a reduction in the amount of secular color deviation.

Next, an embodiment of the invention according to example embodiments will be described.

Figure 10A:
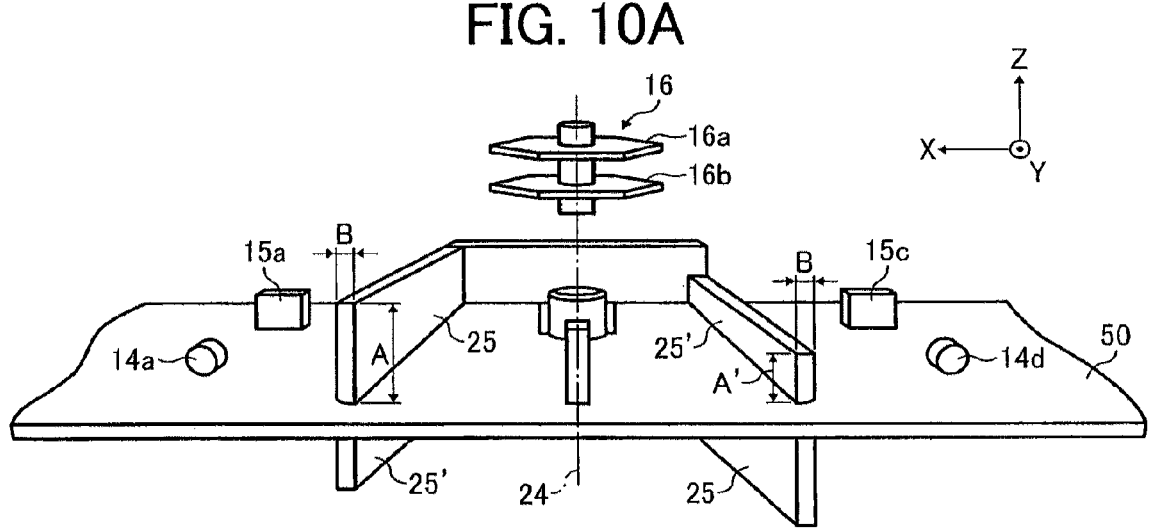
FIGS. 10A and 10B are diagrams for explaining a feature of the invention according to example embodiments.

FIG. 10A shows an example of rib structures that are formed on both top and bottom surfaces of the housing substrate 50 where the optical elements of the optical system prior to the rotating deflection unit are arranged. The rib structures have different rib heights on the top and bottom of the housing substrate 50.

The present embodiment can provide the effect of preventing color deviation, which is available from the configuration of the embodiment shown in FIGS. 8A and 8B, with higher reliability.

That is, while the configuration shown in FIGS. 8A and 8B provide sufficient effects of reducing color deviation, it may sometimes lower the rigidity of the housing.

For sufficient rigidity, ribs are then formed both on the top and bottom surfaces of the housing substrate 50 where the optical elements prior to the rotating deflection unit 16 are arranged. For example, on the light source 13a (optical path R) side, the rib formed on the top surface of the housing substrate 50 where the optical elements are arranged is made higher (A>A'). On the light source 13d (optical path L) side, the rib formed on the bottom surface of the housing substrate 50 where the optical elements are arranged is made higher (A>A'). Such a configuration can provide the same effect as described in FIG. 8B.

In the present embodiment, as is the case shown in FIG. 8A, the light source 13a (optical path R) side makes a displacement vertically downward while the light source 13d (optical path L) side makes a displacement vertically upward. As is the case shown in FIG. 9, the positions of the scanning lines on the photosensitive elements are therefore displaced in the same directions, which can reduce the amount of relative variation between the variations of the positions of the scanning lines.

Figure 10B:
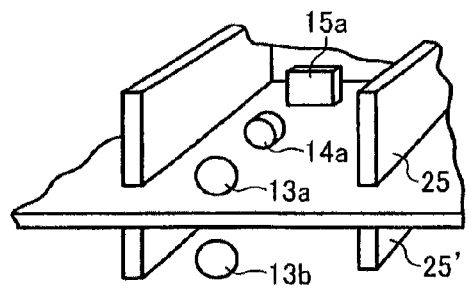

When ribs are formed on both the top and bottom of the housing substrate 50 where the optical elements are arranged as in the present embodiment, the ribs may be formed on both sides of the light sources as shown in FIG. 10B. Such a configuration can further increase the rigidity of the housing substrate 50 at the locations where the group of optical elements prior to the rotating deflection unit 16 are arranged.

Next, an embodiment of the invention according to example embodiments will be described.

Figure 11:
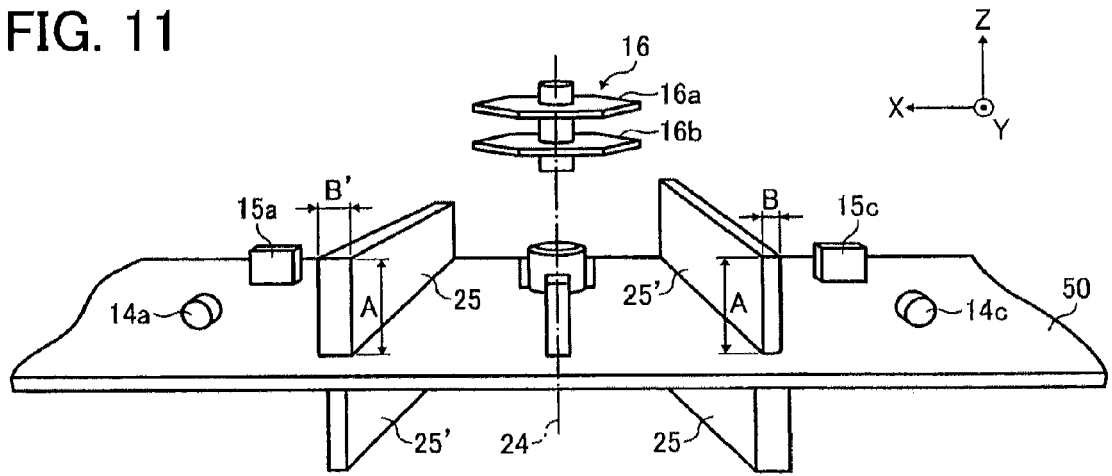
FIG. 11 is a diagram for explaining a feature of the invention according to example embodiments.

FIG. 11 shows a state where ribs 25 of different cross-sectional shapes are formed in the right and left optical systems with the rotating deflection unit 16 as the axis of symmetry. That is, the ribs (designated by the reference numerals 25 and 25' in FIG. 11) on the right and left (optical path R and optical path L) of the rotating deflection unit 16 have respective different cross-sectional shapes, so that the optical path R side and the optical path L side become asymmetrical.

In the configuration shown in FIGS. 10A and 10B, the housing rigidity is improved by providing the ribs of different heights on the top and bottom surfaces of the housing substrate 50. In contrast, according to the present embodiment, the ribs 25 and 25' formed on the top and bottom surfaces where the optical elements are arranged have almost the same height so that housing rigidity can be obtained more effectively even at a smaller height. The ribs on the top and bottom surfaces are, instead, formed in different thicknesses in the direction perpendicular to the sectional height (in FIG. 11, the rib 25 located on the top surface of the light source 13a side and the rib 25 located on the bottom surface of the light source 13d side are formed to be wider than the ribs 25'). The ribs of greater volumes expand more easily.

According to the configuration of such an embodiment, as is the case shown in FIG. 8A, the light source 13a (optical path R) side makes a displacement vertically downward while the light source 13d (optical path L) side makes a displacement vertically upward. As is the case shown in FIG. 9, the positions of the scanning lines on the photosensitive elements are therefore displaced in the same directions, which can reduce the amount of relative variation between the variations of the positions of the scanning lines. The same result as shown in FIG. 9 is also obtained with the light source 13b (optical path R) and the light source 13c (optical path L).

Next, an embodiment of the invention according to example embodiments will be described.

Figure 12:
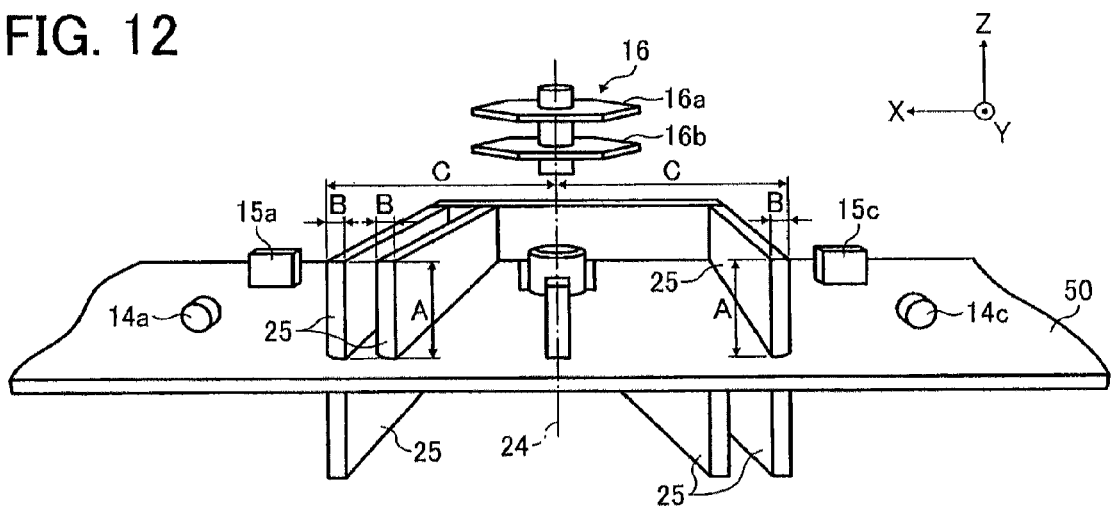
FIG. 12 is a diagram for explaining a feature of the invention according to example embodiments.

FIG. 12 shows a state where the rib structures in the right and left optical systems include different numbers of ribs.

While it is effective in obtaining housing rigidity to change the cross-sectional shapes of the ribs 25, glass-containing materials are typically used for improved rigidity.

Such a material has low resin fluidity. Forming the housing in uniform thickness can improve the resin fluidity for higher housing precision. In the technology according to example embodiments, the warping direction of the housing can be controlled by forming ribs with almost the same cross section but in different numbers.

In FIG. 12, the rib structures with greater numbers of ribs (in the diagram, the upper structure on the light source 13a side and the lower structure on the light source 13d side) are higher in volume. The greater expansion of such ribs provides the same effect as in FIG. 8A on the surfaces where the optical elements are arranged. As in FIG. 9, the positions of the scanning lines on the photosensitive elements can be displaced in the same directions.

Next, an embodiment of the inventions according to example embodiments will be described.

Figure 13:
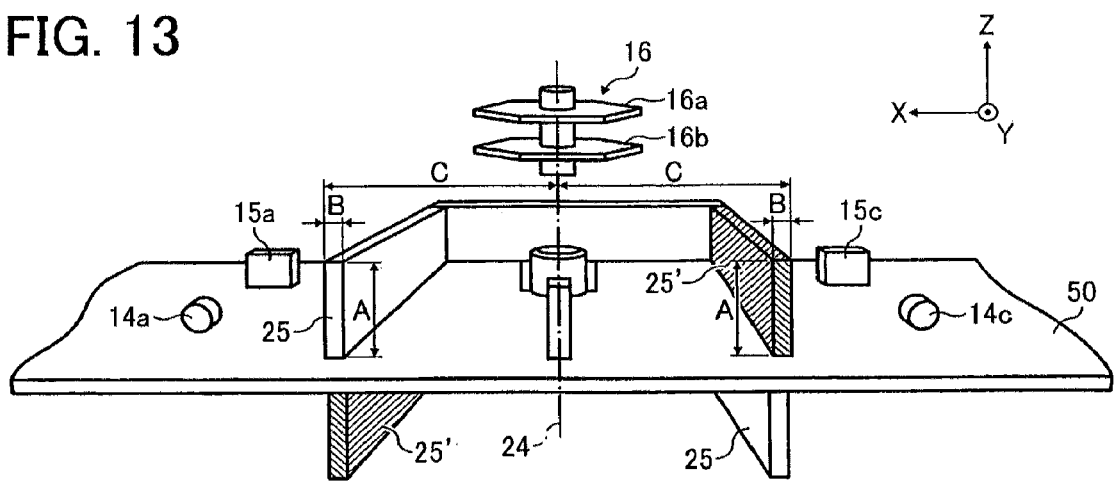
FIG. 13 is a diagram for explaining a feature of the inventions according to example embodiments.

FIG. 13 shows a state where the rib structures include different rib members or rib members having different coefficients of thermal expansion in the right and left optical systems, symmetric about the rotating deflection unit as the axis of symmetry.

With the diversity of series of image forming apparatuses, one single housing is typically used for a plurality of models. The effect of reducing secular color deviation can be obtained from the same configuration if all the models are comparable in the amount of heat generation of the rotating deflection unit 16. Some rotating deflection units 16, however, have different numbers of rotations, which can be disadvantageous to the reduction of secular color deviation.

Selecting rib members and rib shapes depending on the amount of heat generation of each rotating deflection unit 16 allows optimum control on the amount of housing warpage. Such separate rib members 25 may be fixed by means of screw fastening, fitting, adhesion, etc.

Since the separate configuration allows selection of materials having a coefficient of thermal expansion different from that of the housing, the amount of warpage can be optimized as compared to the case where the ribs are made of the same material as the housing. For example, given the time after the start of continuous printing is same, the ribs 25 that are made of members having a higher coefficient of thermal expansion start expanding earlier. If the amount of warping of the housing and the timing to start warping are known in advance, it is even possible to configure the housing by canceling the warping thereof itself. This can enhance the effect of reducing secular color deviation.

Next, an embodiment of the invention according to example embodiments will be described.

Figure 14A:
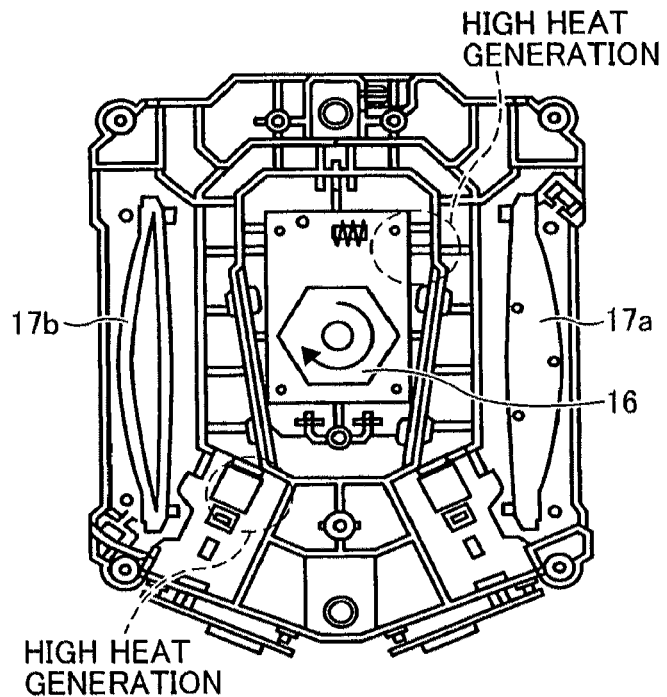
FIGS. 14A and 14B are diagrams for explaining a feature of the invention according to example embodiments.

The heat generated by the rotating deflection unit 16 has a generally concentric distribution about the rotation center. Depending on the layout of the rotating deflection unit 16, the distribution can sometimes be symmetric about the point. In particular, when the rotating deflection unit 16 is arranged in an open layout, the air flows created by its own rotation produce asymmetric flows of hot air such as shown by the dashed line in FIG. 14A.

In such a case, the ribs extending from the light source sections 13 to the vicinity of the rotating deflection unit 16 can be unevenly heated if the ribs are arranged at equal angles about the rotating deflection unit 16. Consequently, the amount of warping of the surfaces where the optical elements prior to the rotating deflection unit are arranged and the timing of occurrence of warping, predicated on the configurations described in the foregoing embodiments, may be different on the optical path R side and the optical path L side.

Figure 14B:
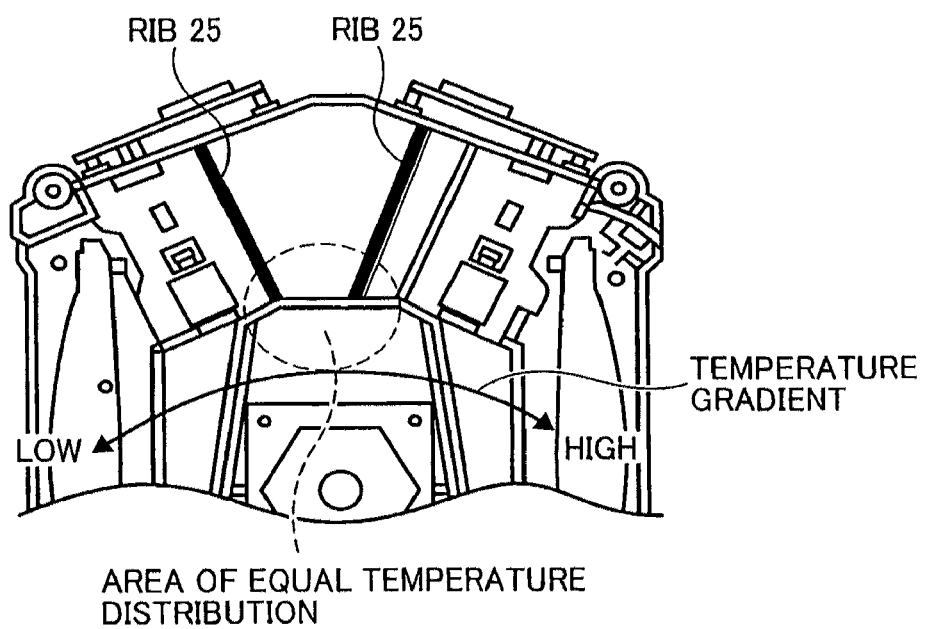

In order not to undermine the effect of reducing color deviation, the ribs may be arranged at positions of similar temperature distributions as shown in FIG. 14B. Such arrangement can prevent the occurrence of the above-mentioned problem, making it possible to provide the effect of preventing deviation of the optical paths with higher reliability.

According to the present invention, ribs are formed on the housing substrate near the areas extending from the respective light sources to the vicinity of the rotating deflection unit. The ribs are arranged asymmetrically in the right and left optical systems with the rotating deflection unit as the axis of symmetry. The directions of thermal deformation of the housing substrate from the rotating deflection unit can thus be changed between the right and left sides of the rotating deflection unit. This can reduce the amount of variation in relative position even if the irradiation positions of the photosensitive elements with the respective light beams vary due to thermal deformation. More specifically, the directions of deviation of the irradiation positions on the respective photosensitive elements are made identical so that the irradiation positions deviate to vary in the same directions on the respective photosensitive elements. This suppresses the occurrence of color deviation due to a difference in the directions of variation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device of opposed scanning type, comprising:
   a plurality of light sources corresponding to a plurality of photosensitive elements, the light sources being arranged substantially symmetrically about a rotating deflection unit that is located substantially in a center of an optical housing;
   a group of pre-deflection optical elements including at least one or a plurality of optical elements that shape divergent light from the light sources into light beams having a predetermined cross-sectional shape and make the light beams incident on the rotating deflection unit; and
   scanning optical systems
      which are provided to perform exposure scanning on the photosensitive elements with the respective corresponding light sources, each of which includes a reflecting optical element and at least one lens having power in a main-scanning direction and a sub-scanning direction, and which are distributed to right and left with the rotating deflection unit as an axis of symmetry, wherein optical elements of the respective scanning optical systems are arranged substantially symmetrically about the rotating deflection unit, and the optical elements are arranged in a same order of arrangement performing exposure scanning on the plurality of photosensitive elements simultaneously, wherein a plurality of rib structures are arranged on respective areas of an optical housing substrate where the group of pre-deflection optical elements are arranged, the areas extends from the respective light sources to a vicinity of the rotating deflection unit, and the plurality of rib structures are arranged asymmetrically in the right and left optical systems with the rotating deflection unit as the axis of symmetry, so as to suppress an amount of variation in positions of scanning lines of the light beams on the photosensitive elements when the areas are displaced by thermal expansion.

2. The optical scanning device according to claim 1, wherein the plurality of rib structures, in the right and left optical systems with the rotating deflection unit as the axis of symmetry, are arranged on top and bottom of respective different surfaces of the optical housing substrate on which the group of pre-deflection optical elements are arranged.

3. The optical scanning device according to claim 1, wherein the plurality of rib structures are arranged on both top and bottom surfaces of the optical housing substrate in the areas where the group of pre-deflection optical elements are arranged, and have different rib heights on the top and bottom.

4. The optical scanning device according to claim 1, wherein the rib structures in the right and left optical systems with the rotating deflection unit as the axis of symmetry have respective different cross-sectional shapes.

5. The optical scanning device according to claim 1, wherein the rib structures in the right and left optical systems with the rotating deflection unit as the axis of symmetry include respective different numbers of ribs.

6. The optical scanning device according to claim 1, wherein the rib structures are composed of members different from the optical housing substrate.

7. The optical scanning device according to claim 6, wherein the rib structures composed of members different from the optical housing substrate have respective different coefficients of thermal expansion in the right and left optical systems with the rotating deflection unit as the axis of symmetry.

8. The optical scanning device according to claim 1, wherein the rib structures in the right and left optical systems with the rotating deflection unit as the axis of symmetry are positioned at respective different angles from the rotating deflection unit.

9. An image forming apparatus comprising the optical scanning device according to claim 1.

* * * * *